(12) United States Patent
Xu

(10) Patent No.: US 9,402,288 B2
(45) Date of Patent: Jul. 26, 2016

(54) BACKLIGHT OF LIQUID CRYSTAL DISPLAY DEVICE AND DRIVING CIRCUIT THEREOF

(71) Applicant: SHENZHEN CHINA STAR OPTOELECTRONICS TECHNOLOGY CO., LTD., Shenzhen, Guangdong (CN)

(72) Inventor: Xiangyang Xu, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 58 days.

(21) Appl. No.: 14/380,905

(22) PCT Filed: May 15, 2014

(86) PCT No.: PCT/CN2014/077592
§ 371 (c)(1),
(2) Date: Aug. 25, 2014

(87) PCT Pub. No.: WO2015/127719
PCT Pub. Date: Sep. 3, 2015

(65) Prior Publication Data
US 2015/0366017 A1 Dec. 17, 2015

(30) Foreign Application Priority Data
Feb. 27, 2014 (CN) .......................... 2014 1 0069696

(51) Int. Cl.
*H05B 37/00* (2006.01)
*H05B 33/08* (2006.01)
(Continued)

(52) U.S. Cl.
CPC ...... *H05B 33/0821* (2013.01); *G02F 1/133603* (2013.01); *G09G 3/34* (2013.01); *H05B 33/0809* (2013.01); *G02F 2001/133612* (2013.01)

(58) Field of Classification Search
CPC ........... H05B 33/0815; H05B 33/0827; H05B 33/0821

USPC ...... 315/185 R, 191–192, 291, 294, 297, 307
See application file for complete search history.

(56) References Cited

U.S. PATENT DOCUMENTS 6,411,045 B1 * 6/2002 Nerone ................. H02M 7/538
 315/185 R
6,853,150 B2 * 2/2005 Clauberg ........... H05B 33/0818
 315/185 R
(Continued)

FOREIGN PATENT DOCUMENTS

CN 101150903 A 3/2008
CN 101923841 A 8/2010
(Continued)

OTHER PUBLICATIONS

International Search Report dated Nov. 15, 2014.

*Primary Examiner* — Jason M Crawford
(74) *Attorney, Agent, or Firm* — Stein IP, LLC

(57) ABSTRACT

The present invention relates to a backlight of a liquid crystal display device and a driving method thereof. The backlight comprises a LED lamp bead group and a backlight driving module. The LED lamp bead group includes a plurality of strings of LED lamp bead which are opposite in term of positive and negative directions. The backlight driving module is electrically connected to the LED lamp bead group to output a voltage signal and a current signal to drive the LED lamp bead group, wherein the voltage signal is configured as more than one serials of periodic square-wave signal, under the action of which a string of LED lamp bead of positive direction and a string of LED lamp bead of negative direction emit light in an alternate manner, and the brightness of emitted light is determined by the magnitude of the current signal.

5 Claims, 3 Drawing Sheets

(51) Int. Cl.
*G09G 3/34* (2006.01)
*G02F 1/1335* (2006.01)

(56) References Cited

U.S. PATENT DOCUMENTS

| | | | | |
|---|---|---|---|---|
| 7,025,473 | B2* | 4/2006 | Dokoupil | F21S 8/035 362/295 |
| 8,330,391 | B2* | 12/2012 | Wendt | H02M 3/3376 315/185 R |
| 8,427,071 | B2* | 4/2013 | Liang | H05B 33/0806 315/185 R |
| 8,810,141 | B2* | 8/2014 | Takeda | H05B 33/0818 315/192 |
| 2007/0024254 | A1* | 2/2007 | Radecker | H02M 7/537 323/247 |
| 2008/0203936 | A1* | 8/2008 | Mariyama | H05B 33/0815 315/246 |
| 2010/0066258 | A1* | 3/2010 | Yasuda | H05B 33/0803 315/186 |
| 2010/0079085 | A1* | 4/2010 | Wendt | H05B 33/0815 315/294 |
| 2014/0117878 | A1* | 5/2014 | Prodic | H05B 33/0815 315/307 |
| 2014/0333219 | A1* | 11/2014 | Zijlstra | H05B 33/0809 315/192 |

FOREIGN PATENT DOCUMENTS

| | | |
|---|---|---|
| CN | 201854468 U | 11/2010 |
| CN | 101990347 A | 3/2011 |
| CN | 102271438 A | 12/2011 |
| CN | 102340904 A | 2/2012 |
| CN | 102883505 A | 1/2013 |
| KR | 1020080050874 A | 6/2008 |

* cited by examiner ions output by the backlight driving module is correspondingly a serial of periodic square-wave signal, the amplitude of which may be twice of voltage of the common electrode, and the voltage of the common electrode is greater than or equal to a turn-on voltage of the string of LED lamp bead.

BACKLIGHT OF LIQUID CRYSTAL DISPLAY DEVICE AND DRIVING CIRCUIT THEREOF

FIELD OF THE INVENTION

The present disclosure relates to a backlight driving technology for a display device, in particular to a backlight of a large-sized liquid crystal display device and a driving circuit thereof.

BACKGROUND OF THE INVENTION

A liquid crystal display device is a passive display device which mainly realizes picture display by changing the quantity of transmitted light of a backlight by means of deflection of liquid crystal molecules. Accordingly, the liquid crystal display device generally includes two parts, namely a liquid crystal panel and a backlight. The backlight generally has two types of light source: a cold cathode fluorescence lamp (CCFL) and a light emitting diode (LED). Compared with the CCFL, the LED has advantages of small size, long service life, high efficiency and the like. Therefore, nearly all the liquid crystal display devices available on the present markets are configured with LED backlights. FIG. 1 is a schematic diagram of a circuit composition of a LED backlight of a liquid crystal display device in the prior art. The circuit mainly includes a backlight driving module 110 and a LED lamp bead group 120, wherein the backlight driving module 110 provides a voltage signal and a current signal required by the LED lamp bead group 120 to emit light. The LED lamp beads are typically driven by direct current, and the brightness of emitted light of the LED lamp beads depends on the magnitude of the driving current. The magnitude of the driving current is generally adjusted according to a pulse modulation signal PWM input from outside.

At present, for a large-sized liquid crystal display panel, since the display area of the panel is relatively large and thus relatively high backlight brightness is needed, the light emitting time of the LED lamp beads must be prolonged. In other words, as higher driving current is needed for driving the LED lamp beads, the heat generated thereby is also increased, and the ambient temperature is thus raised. Under such case, the operation property of a LED lamp bead would be correspondingly changed with extension of the operation time, so that its service life is shortened and the light emitting quality is declined. Particularly, the color gamut is also changed, which affects the colors of pictures output by the liquid crystal display device.

SUMMARY OF THE INVENTION

Aiming at the above-mentioned problems, the present disclosure proposes a new backlight of a liquid crystal display device and a driving method thereof.

The backlight comprises: a LED lamp bead group, including a plurality of strings of LED lamp bead which are opposite in term of positive and negative directions; and a backlight driving module, an output end of which is electrically connected to the LED lamp bead group to output a voltage signal and a current signal to drive the LED lamp bead group, wherein the voltage signal may be configured as more than one serials of periodic square-wave signal, under the action of which a string of LED lamp bead of positive direction and a string of LED lamp bead of negative direction emit light in an alternate manner, and the brightness of emitted light is determined by the magnitude of the current signal.

According to one specific embodiment of the present disclosure, the strings of LED lamp bead which are opposite in term of positive and negative directions may be connected in parallel to each other, wherein one end of each string is electrically connected to the output end of the backlight driving module, and the other end thereof is electrically connected to a common electrode; and the voltage signal output by the backlight driving module is correspondingly a serial of periodic square-wave signal, the amplitude of which may be twice of voltage of the common electrode, and the voltage of the common electrode is greater than or equal to a turn-on voltage of the string of LED lamp bead.

According to another specific embodiment of the present disclosure, the above-mentioned voltage signal may also be configure to be two serials of periodic square-wave signal, the amplitudes of which two are same and greater than or equal to the turn-on voltage of the string of LED lamp bead, and the frequencies of which two are same but have a phase difference of half period, Correspondingly, the strings of LED lamp bead of positive direction are connected in parallel to each other, wherein one end of each string is electrically connected to a first output end of the backlight driving module and the other end thereof is electrically grounded, so as to receive a first serial of periodic square-wave signal; and the stings of LED lamp bead of negative direction are connected in parallel to each other, wherein one end of each string is electrically connected to a second output end of the backlight driving module and the other end thereof is electrically grounded, so as to receive a second serial of periodic square-wave signal.

Further, a frequency of the above-mentioned periodic square-wave signal is preferably more than 50 Hz.

Moreover, preferably, the number of the strings of LED lamp bead of positive direction is the same as that of the strings of LED lamp bead of negative direction, and each of the strings of LED lamp bead includes the same number of series-connected LEDs.

In addition, the present disclosure further provides a backlight driving method of a liquid crystal display device, which comprises the steps of outputting a voltage signal and a current signal to drive a LED lamp bead group including a plurality of strings of LED lamp bead which are opposite in term of positive and negative directions; wherein, the voltage signal is configured to be more than one serial of periodic square-wave signal, which enable a string of LED lamp bead of positive direction and a string of LED lamp bead of negative direction to emit light in an alternate manner, at the meanwhile, the magnitude of the current signal is controlled to adjust the brightness of emitted light of the string of LED lamp bead of positive/negative direction.

According to one specific embodiment of the present disclosure, in the case that the strings of LED lamp bead which are opposite in term of positive and negative directions are connected in parallel to each other, one end of which string is electrically connected to an output end of a backlight driving module and the other end of which string is electrically connected to a common electrode, the output voltage signal is a serial of periodic square-wave signal, the amplitudes of which is twice of voltage of the common electrode, and the voltage of the common electrode is greater than or equal to a turn-on voltage of the string of LEDs.

According to another specific embodiment of the present disclosure, in the case that the strings of LED lamp bead of positive direction are connected in parallel to each other and electrically connected to a the first output end of the backlight driving module and the strings of LED lamp bead of negative direction are connected in parallel to each other and electrically connected to a second output end of the backlight driving module, the voltage signal is configured as two serials of periodic square-wave signal, the amplitudes of which two are same and greater than or equal to the turn-on voltage of the string of LED lamp bead, and frequencies of which two are same and have a phase difference of half period.

Further, a frequency of the above-mentioned periodic square-wave signal is more than 50 Hz.

Compared with the prior art, the backlight of the liquid crystal display panel and the driving method thereof proposed by the present disclosure have the following beneficial effects:

1) The present disclosure proposes that the strings of LED lamp bead in the backlight of the liquid crystal display panel are configured to be opposite in term of positive and negative directions, and the backlight driving module applies a voltage signal in form of periodic square-wave to the LED lamp beads so that the LED lamp beads may emit light in an alternate manner. In this way, purposes of halving the light emitting time of the LED lamp beads and then prolonging the service life of the LED back light are fulfilled.

2) In the present disclosure, by using the characteristic that LED may keep afterglow for dozens of microseconds after blackout, the periodic square-wave signal of which the frequency is more than 50 Hz is preferable to drive the LED lamp beads to emit light in an alternative manner, so that the LED lamp beads may operate for half of the time and rest for the other half. Since human eyes have inert memory for flowing light spots, a user obtains a perceptive impression of continuous light-emission of the LED lamp beads. Thus, the adverse phenomenon in the prior art as color gamut being changed due to long-time operation of the LED lamp beads may be effectively eliminated without affecting the backlight energy efficiency.

Other features and advantages of the present disclosure will be explained in the following description, and will be partially obvious from the description or understood by implementing the present disclosure.

BRIEF DESCRIPTION OF THE DRAWINGS

The accompanying drawings are provided for further understanding of the present disclosure, and constitute a part of the description for interpreting the present disclosure together with the embodiments of the present disclosure, rather than limiting the present disclosure. In the accompanying drawings.

DETAILED DESCRIPTION OF THE EMBODIMENTS

In order that the technical contents disclosed by the present disclosure are more detailed and complete, the objectives, technical solutions and technical effects of the present disclosure will be described below in detail with reference to the accompanying drawings and specific embodiments. It should be specially noted that, terms "positive direction" and "negative direction" below are relative concepts with respect to each other. For example, a string of LED lamp bead in the figure, of which the upper end is anode and the lower ends is cathode, may be called as a string of LED lamp bead of positive direction, while a string of LED lamp bead in the figure, of which the upper end is cathode and the lower end is anode, may be called as a string of LED lamp bead of negative direction. However, those skilled in the art should understand that, this is only for schematic illustration, and the technical solution of the present disclosure is not limited to so.

Figure 1:
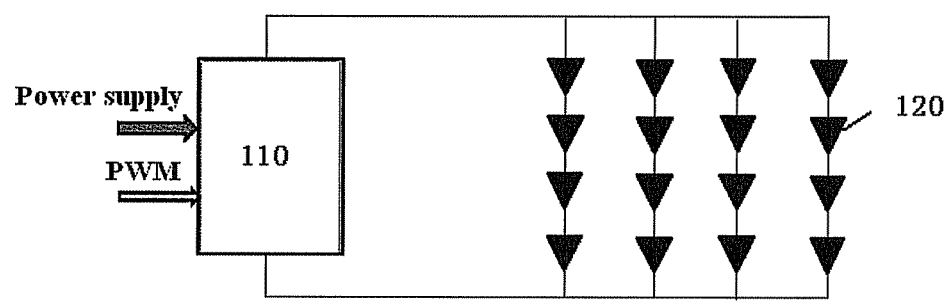
FIG. 1 is a schematic diagram of circuit composition of a LED backlight of a liquid crystal display device in the prior art.
Figure 2:
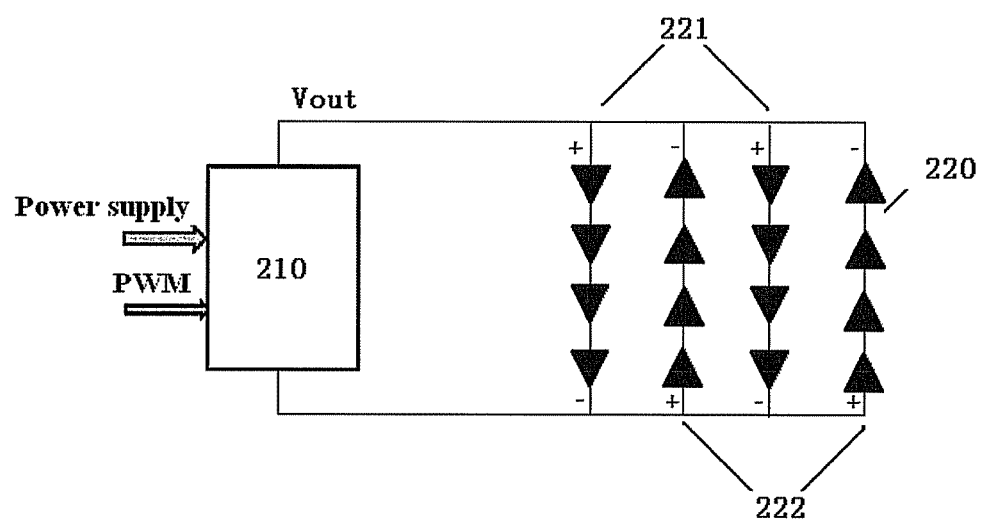
FIG. 2 is a schematic diagram of circuit composition of a LED backlight according to embodiment I of the present disclosure.

FIG. 2 is a schematic diagram showing composition of a circuit of a LED backlight in embodiment I of the present disclosure. It could be seen from the figure that, the circuit includes a backlight driving module 210 and a LED lamp bead group 220. Difference from the prior art, the LED lamp bead group 220 includes a plurality of strings of LED lamp bead which are connected in parallel but opposite in term of positive or negative directions. Preferably, the string of LED lamp bead of positive direction 221 and the string of LED lamp bead of negative direction 222 are arranged in an alternate manner, and the number of the strings of positive direction is the same with that of the strings of negative direction. Each of the strings of LED lamp bead includes the same number of series-connected LEDs.

In this embodiment, regardless of it is either the string of LED lamp bead of positive direction 221 or the string of LED lamp bead of negative direction 222, one end of the string is electrically connected to an output end of the backlight driving module 210, and the other end thereof is electrically connected to a common electrode (not shown in the figure). Therefore, a driving voltage either acting on the string of LED lamp bead of positive direction 221 or acting on the string of LED lamp bead of negative direction 222 is substantially a difference between a voltage signal Vout output by the backlight driving module 210 and a voltage Vcom of the common electrode.

Figure 3:
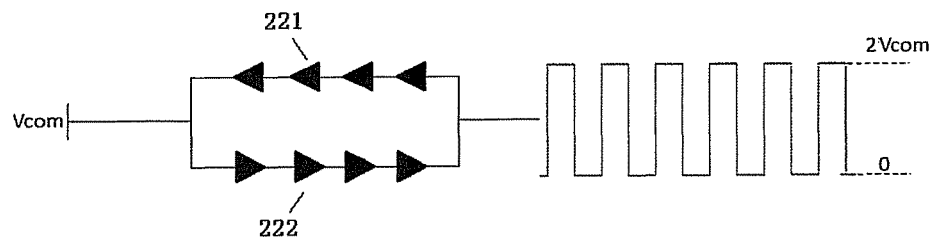
FIG. 3 is a schematic diagram of waveform of a voltage signal output by a backlight driving module according to embodiment I of the present disclosure.

In this embodiment, to achieve the technical effect that the string of LED lamp bead of positive direction 221 and the string of LED lamp bead of negative direction 222 emit light in an alternate manner, the backlight driving module 210 outputs a serial of periodic square-wave signal shown in FIG. 3. The amplitude of the periodic square-wave signal is twice of voltage of the common electrode, namely 2Vcom, and the voltage Vcom of the common electrode is greater than or equal to a turn-on voltage of one string of LED lamp bead. Therefore, in each period of the periodic square-wave signal:

in the first half period, the voltage difference between the voltage signal Vout output by the backlight driving module 210 and the voltage Vcom of the common electrode is +Vcom, under the action of which, the string of LED lamp bead of positive direction 221 emits light, while the string of LED lamp bead of negative direction rests;

in the second half period, the voltage difference between the voltage signal Vout output by the backlight driving module 210 and the voltage Vcom of the common electrode is −Vcom, under the action of which, the string of LED lamp bead of negative direction emits light, while the string of LED lamp bead of positive direction rests.

No matter it is either the string of LED lamp bead of positive direction 221 or the string of LED lamp bead of negative direction 222 that would emit light, the backlight driving module 210 may change the magnitude of the output current signal according to a pulse modulation signal PWM input from outside, so as to adjust the brightness of emitted light of the string of LED lamp bead. Since this belongs to the prior art, no further description will be made herein.

Figure 4:
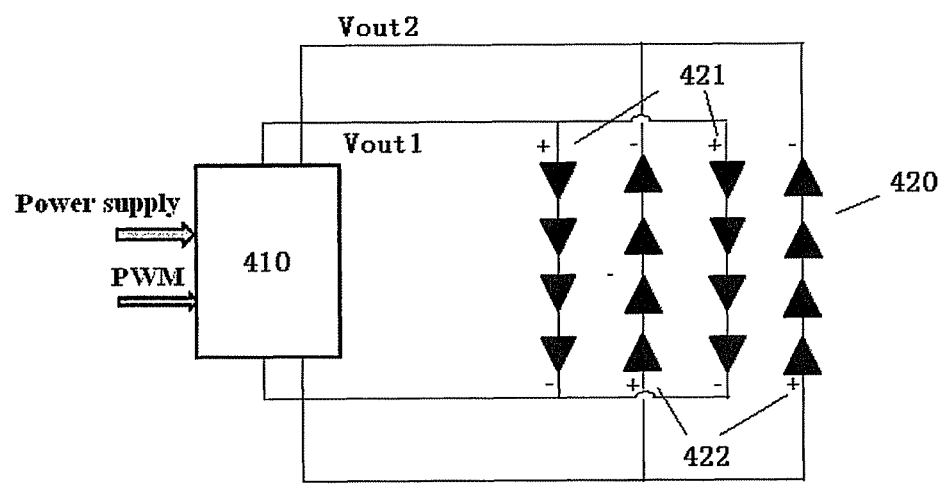
FIG. 4 is a schematic diagram of circuit composition of a LED backlight according to embodiment II of the present disclosure.

FIG. 4 is a schematic diagram of composition of a circuit of a LED backlight in embodiment II of the present disclosure. It could be seen from the figure that, the circuit includes a backlight driving module 410 and a LED lamp bead group 420. Similar to the embodiment I, the LED lamp bead group 420 includes a plurality of strings of LED lamp bead which are arranged in parallel but opposite in term of the positive and negative directions. In the case, the strings of LED lamp bead of positive direction 421 are connected in parallel to each other, wherein one end of each string is electrically connected to a first output end of the backlight driving module 410 and the other end thereof is electrically grounded, so as to receive a first voltage signal output by the backlight driving module 410. Meanwhile, the strings of LED lamp bead of negative direction 422 are connected in parallel to each other, wherein one end of each string is electrically connected to a second output end of the backlight driving module 410 and the other end thereof is electrically grounded, so as to receive a second voltage signal output by the backlight driving module 410. Moreover, preferably, the number of the strings of LED lamp bead of positive direction 421 is the same as that of the strings of LED lamp bead of negative direction 422. Each of the strings of LED lamp bead includes the same number of series-connected LED lamp beads.

Figure 5:
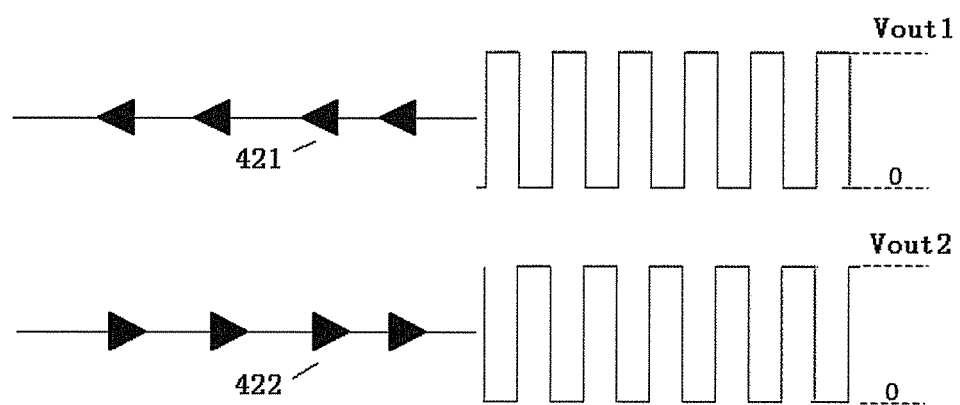
FIG. 5 is a schematic diagram of waveform of voltage signals output by a backlight driving module according to embodiment II of the present disclosure.

In this embodiment, to achieve the technical effect that the string of LED lamp bead of positive direction 421 and the string of LED lamp bead of negative direction emit light in an alternate manner, the backlight driving module 410 outputs two serials of periodic square-wave signal shown in FIG. 5 through the first output end and the second output end respectively. In this case, the amplitude of these two serials of periodic square-wave signal, having the same frequency but a phase difference of half period, are both greater than or equal to a turn-on voltage of one string of LED lamp bead. That is, the first output end of the backlight driving module 410 outputs a first periodic square-wave signal Vout1; and the second output end of the backlight driving module 410 outputs a second periodic square-wave signal Vout2.

Moreover, due to the phase difference of half period between the first periodic square-wave signal Vout1 and the second periodic square-wave signal Vout2, when the first output end outputs a high level, the second output end outputs a low level which may be zero or lower than the turn-on voltage of a string of LED lamp bead. As a result, the strings of LED lamp bead of positive direction 421 emit light, while the strings of LED lamp bead of negative direction 422 rest;

when the second output end outputs a high level, the first output end outputs a low level which may be zero or lower than the turn-on voltage of a string of LED lamp bead. As a result, the strings of LED lamp bead of negative direction 422 emit light, while the strings of LED lamp bead of positive direction 421 rest.

Similarly, no matter it is either the string of LED lamp bead of positive direction 421 or the string of LED lamp bead of negative direction 422 that would emit light, the backlight driving module 410 may change the magnitude of the output current signals according to the pulse modulation signal PWM input from outside, so as to adjust the brightness of emitted light of the string of LED lamp bead. Since this is the prior art, no further description will be made herein.

Moreover, in the above-mentioned two embodiments, frequencies of respective periodic square-wave signals may be preferably more than 50 Hz.

Although the implementations disclosed by the present disclosure are described above, the contents described herein are merely embodiments adopted for better understanding of the present disclosure, rather than limiting the present disclosure. Any modifications and variations made on the implementation form and detail by any skilled in the art without departing from the spirit and scope of the present disclosure shall fall within the patent protection scope of the present disclosure.

The invention claimed is:

1. A backlight of a liquid crystal display device, comprising:
    a LED lamp bead group, including a plurality of strings of LED lamp bead which are opposite in term of positive and negative directions;
    a backlight driving module, an output end of which is electrically connected to the LED lamp bead group to output a voltage signal and a current signal to drive the LED lamp bead group, wherein the voltage signal is configured as more than one serials of periodic square-wave signal, under the action of which a string of LED lamp bead of positive direction and a string of LED lamp bead of negative direction emit light in an alternate manner, and the brightness of emitted light is determined by the magnitude of the current signal, wherein
    the voltage signal output by the backlight driving module is configured as two serials of periodic square-wave signal, the amplitudes of which two are same and greater than or equal to the turn-on voltage of the string of LED lamp bead, and the frequencies of which two are same but have a phase difference of half period;
    the strings of LED lamp bead of positive direction are connected in parallel to each other, wherein one end of each string of positive direction is electrically connected to a first output end of the backlight driving module and the other end thereof is electrically grounded, so as to receive a first serial of periodic square-wave signal; and
    the strings of LED lamp bead of negative direction are connected in parallel to each other, wherein one end of each string of negative direction is electrically connected to a second output end of the backlight driving module and the other end thereof is electrically grounded, so as to receive a second serial of periodic square-wave signal.

2. A backlight of claim 1, wherein,
a frequency of the periodic square-wave signal is more than 50 Hz.

3. A backlight of claim 1, wherein,
the number of the strings of LED lamp bead of positive direction is the same as that of the strings of LED lamp bead of negative direction, and each of the strings of LED lamp bead includes the same number of series-connected LED lamp beads.

4. A backlight driving method of a liquid crystal display device, comprising the steps of:
    outputting a voltage signal and a current signal to drive a LED lamp bead group including a plurality of strings of LED lamp bead which are opposite in term of positive and negative directions;
    wherein the voltage signal is configured as more than one serial of periodic square-wave signal, which enable a string of LED lamp bead of positive direction and a string of LED lamp bead of negative direction to emit light in an alternate manner, at the meanwhile, the magnitude of the current signal is controlled to adjust the brightness of emitted light of the string of LED lamp bead of positive/negative direction wherein, in the case that the strings of LED lamp bead of positive direction are connected in parallel to each other and electrically connected to a the first output end of the backlight driving module and the strings of LED lamp bead of negative direction are connected in parallel to each other and electrically connected to a second output end of the backlight driving module, the voltage signal is configured as two serials of periodic square-wave signal, the amplitudes of which two are same and greater than or equal to the turn-on voltage of the string of LED lamp bead, and frequencies of which two are same and have a phase difference of half period.

5. A backlight driving method of claim 4, wherein,
a frequency of the periodic square-wave signal is more than 50 Hz.

* * * * *